(12) United States Patent
Sardella et al.

(10) Patent No.: US 7,127,638 B1
(45) Date of Patent: Oct. 24, 2006

(54) METHOD AND APPARATUS FOR PRESERVING DATA IN A HIGH-AVAILABILITY SYSTEM PRESERVING DEVICE CHARACTERISTIC DATA

(75) Inventors: Steven D. Sardella, Marlborough, MA (US); Keith A. P. Morrissette, Whitinsville, MA (US); Brian K. Bailey, Mendon, MA (US); Darrin Haug, Bellingham, MA (US); Joseph A. Perry, Sutton, MA (US); Andrew Kubicki, Westborough, MA (US); Joseph Shimkus, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 639 days.

(21) Appl. No.: 10/330,806

(22) Filed: Dec. 28, 2002

(51) Int. Cl.
*G06F 11/00* (2006.01)
(52) U.S. Cl. .............................. 714/15; 714/7
(58) Field of Classification Search ............... None
See application file for complete search history.

(56) References Cited

U.S. PATENT DOCUMENTS

| | | | |
|---|---|---|---|
| 5,572,685 A * | 11/1996 | Fisher et al. ................. 710/107 |
| 5,832,503 A * | 11/1998 | Malik et al. .................. 709/223 |
| 6,078,959 A * | 6/2000 | Wright et al. ................ 709/227 |
| 6,173,350 B1 * | 1/2001 | Hudson et al. ............. 710/100 |
| 6,209,060 B1 * | 3/2001 | Machida ....................... 711/114 |
| 6,473,839 B1 * | 10/2002 | Kremser et al. ............. 711/154 |
| 6,496,914 B1 * | 12/2002 | Vook et al. .................. 711/170 |
| 6,754,718 B1 * | 6/2004 | Dobberpuhl et al. ........ 709/250 |
| 6,757,694 B1 * | 6/2004 | Goodman et al. ........ 707/104.1 |
| 6,834,299 B1 * | 12/2004 | Hamilton et al. ............ 709/220 |
| 6,877,042 B1 * | 4/2005 | Tawil et al. ................ 709/250 |
| 6,912,609 B1 * | 6/2005 | Stuber et al. ................ 710/107 |
| 6,931,558 B1 * | 8/2005 | Jeffe et al. .................. 713/340 |
| 2002/0069271 A1 * | 6/2002 | Tindal et al. ............... 709/221 |
| 2003/0237017 A1 * | 12/2003 | Jibbe ............................ 714/4 |
| 2004/0081087 A1 * | 4/2004 | Shea ........................... 370/228 |

OTHER PUBLICATIONS

IEEE 100 The Authoritative Dictionary of IEEE Standards Terms, "checksum", Dec. 2000, Standards Information Network IEEE Press, Seventh Edition, p. 165.*
Rajagopal et al., "RFC 2625: IP and ARP over Fibre Channel", Jun. 1999, Network Working Group: Standards Track.*

* cited by examiner

*Primary Examiner*—Scott Baderman
*Assistant Examiner*—Gabriel L. Chu
(74) *Attorney, Agent, or Firm*—McGuinness & Manaras LLP

(57) ABSTRACT

In a system comprising a plurality of components, characteristic data is stored on programmable read-only-memories (PROMS) on each component. The PROMs are coupled together via a simple bus, and data is retrieved from the PROMs using the bus. The collection of data from the PROMs provides the component characteristic data, and a portion of the component characteristic data is stored in one or more persistent media devices in the system, creating a last known good copy. The persistent storage device could be any device that does not lose data in the event of a loss of power.

23 Claims, 7 Drawing Sheets

METHOD AND APPARATUS FOR PRESERVING DATA IN A HIGH-AVAILABILITY SYSTEM PRESERVING DEVICE CHARACTERISTIC DATA

FIELD OF THE INVENTION

This invention relates generally to the field of high-availability systems and more particularly to a method and apparatus for preserving data in a high-availability system.

BACKGROUND OF THE INVENTION

To provide consistent, high performance client support, businesses typically rely on either fault tolerant or high availability systems. Fault tolerant systems typically include two distinct yet identical processing paths. Each processing path operates on an identical instruction stream in lock-step. In the event of a fault in one of the processing paths, the redundant path provides seamless failover support to the client.

One problem with fault tolerant systems is that they are relatively expensive for the received performance. Each processing path may include many components, and the cost of replicating the components in the redundant path provides increased cost and size with no gain in processing performance. An alternative to the fault tolerant systems are high availability systems. High availability systems are designed with some level of redundancy in order to provide fault tolerance for single points of failure. High availability systems differ from full fault tolerant systems in that not every component is duplicated, and generally the processing paths, while operating in parallel, operate on their own instruction streams. Thus, when both of the processing paths are operational, the entire processing capacity of the system can be realized. In the event of a fault in one of the paths, the other path remains operable, and the system can remain available while that path is repaired. Thus, high-availability systems help to strike a balance between system cost/performance and system reliability.

However, in both fault tolerant and high-availability systems, it is inevitable that there will be some point of failure in the system. As stated above, when this occurs, the failed device must be fixed. For example, a networked storage device may include a number of disks coupled to a pair of processing modules via a midplane. In the event that one of the components coupled to the midplane should fail, the component is swapped out. In high-availability systems, because other redundant components are provided, the swap may be relatively invisible to the user.

However, the swap is not truly invisible. In many typical processing systems, each component of the system includes a distinct serial number, and other data identifying, for example, a type of the component, date of manufacture or the like. For the purpose of this application, such data shall be called 'component characteristic' data. When one device is exchanged for another device, the serial number, type of device, and potentially the system configuration could be altered.

Thus, in order for the processing system to be managed correctly, it is important that a system controller keeps track of the characteristics of the components that comprise the system. For example, in the networked storage system described above, it is important to know the characteristics (such as serial number, type, etc.) of the components (disk devices, processor devices or line cards) coupled to the mid-plane connector. The characteristic data is important from the standpoint of overall system control, as it allows the system controller to appropriately manage the data flow within the system. It is also important for the purposes of support; in the event that there is a failure in the component, it is important to be able to identify that component so that the correct support routines (diagnostics, etc.) can be executed. In addition, it is important should the networked storage device be coupled into an external network. For example, a World Wide Name (WWN) seed is used in a Fibre Channel protocol to provide a unique World Wide Name for a given device coupled into a network. Should the WWN seed be unavailable, the network identity of the system could be lost.

In usual practice, the component characteristic data is maintained manually by the system administrator. When the network device is received, the characteristic data is recorded and stored on one of the devices, or in an external notebook. A problem exists, though, if one or more of the components coupled to the system are swapped out and the stored characteristic data is not updated. Such events happen regularly in the support environment and, as a result, often there is not an up-to-date record of the characteristics of the components that comprise the system. Such inconsistencies could cause problems with network connections and additionally in obtaining the proper system support. It would be desirable to identify an improved method for maintaining component information in a system.

SUMMARY OF THE INVENTION

According to one aspect of the invention, a method for retrieving component characteristic data in a system having a plurality of coupled components includes the steps of storing characteristic data for a subset of the plurality of components in a storage device on the corresponding component, retrieving the characteristic data from each of the components over a bus coupled to each of the components and storing a portion of the retrieved characteristic data in a persistent media device to provide a last known good copy of the portion of characteristic data for the system. With such an arrangement, characteristic data for the overall system can be maintained in the event of many system failure situations.

According to a further aspect of the invention, a system is provided that includes a plurality of coupled components, wherein a subset of the plurality of components each include a storage device for storing characteristic data associated with the component, a bus, coupling the storage devices of each component in the subset of components, and persistent media, for storing a last known good copy of a portion of the characteristic data. In one embodiment, the system includes an isolating mechanism for isolating the system from the effects of failure of the bus. An arbitration mechanism is described that uses a pair of cross over sensing signals, driven by the devices capable of sourcing data on the bus, to provide multi-master arbitration with minimal complexity.

DETAILED DESCRIPTION

Figure 1:
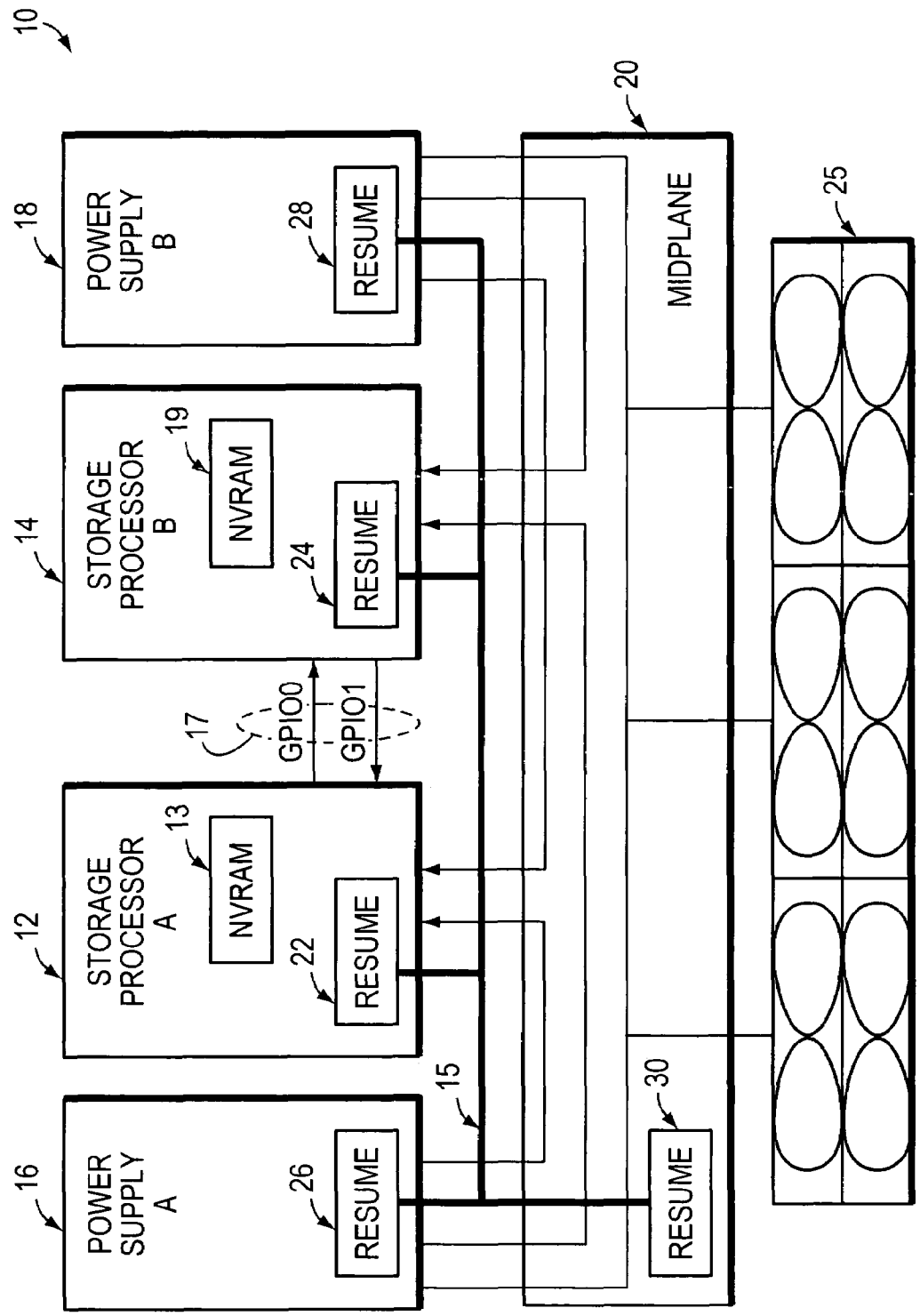
FIG. 1 is a block diagram of an exemplary networked storage system in which the present invention may be implemented.

In accordance with one embodiment of the invention, an architecture for providing persistent storage of component characteristic information in a high availability system will now be described with reference to FIGS. 1–7. FIG. 1 is a block diagram of an exemplary high-availability networked storage system 10 including a number of replaceable components 12, 14, 16 and 18 coupled to a midplane 20. For the purposes of this application, a 'component' shall be defined to mean any portion of the system that can be physically disconnected from the system, that is any Field Replaceable Unit (FRU). For example, the components that can be physically disconnected include power supply modules, processor modules, link control cards (LCC)s, disk drives, and the like. For the purposes of this application, the midplane 20 and enclosure together are considered to be a component.

In FIG. 1, the illustrated components include storage processor A 12, storage processor B 14, power supply A 16 and power supply B 18. The networked storage system 10 may be, for example, one of many storage devices that can be coupled together to form a Storage Area Network (SAN), such as the CLARiiON family of networked storage devices produced by EMC Corporation of Hopkinton Massachusetts.

In the embodiment of FIG. 1, storage processors A and B are networked storage processor modules capable of receiving input from a local area network via network ports (not shown). Data and control are transferred between the processor modules and from a Storage Area Network (SAN) or Network Area Storage (NAS). In addition, the processor module may be capable of driving external and auxiliary devices. According to one embodiment of the invention, the two processor modules also communicate directly with each other over a pair of handshake signal lines 17.

There may be many additional signals provided to and from the storage processors 12 & 14, the power supplies 16 & 18 and the midplane. However, for purposes of clarity, many of the interface signals have been omitted in the below discussion. It should be appreciated that the present invention is not limited to any particular devices having any given number of input or output signal paths.

According to one aspect of the invention, each component 12, 14, 16, 18 and 20 of the networked storage system includes an Electrically Erasable Programmable Read Only Memory device (EEPROM) for storing Resume information. These EEPROMs are hereinafter referred to as Resume Proms and are shown in FIG. 1 as elements 22, 24, 26, 28 and 30. Each of the Resume PROMs 22, 24, 26, 28 and 30 are coupled together by a bus 15. In one embodiment of the invention, the bus that is used to couple the Resume PROMs is a two wire, serial, bi-directional bus, one signal wire for controlling the data flow and one signal for carrying an accompanying clock signal. Exemplary bus structures and protocols that could be used in the present invention include the SMbus protocol, described in the SMBus Control Method Interface Specification, December 1999. Alternatively the $I^2C$ bus protocol of Phillips Semiconductors, the operation of which is known to those of skill in the art. It will be appreciated that any bus interface could be used herein; a selection of a simple two wire interface is discussed below because, for the purpose of the present invention, the two wire bus interface provided a solution having reduced complexity and related costs, while providing the desired fault tolerant attributes.

As shown in FIG. 1, each of the storage processors 12 and 14 have persistent memory (NVRAM) devices 13 and 19. The persistent memory devices could be Non-Volatile Random Access Memory (NVRAM), disk devices, flash EEPROMs, or any type of media that does not lose data while powered down. The provision of NVRAMs in storage processors is typical to the storage processor architecture. As will be described in more detail below, a portion of the existing NVRAMs is used in the present invention to store copies of a portion of the component characteristic data. The portion that is stored in each one of the NVRAMs is that portion of characteristic data that is considered to be critical to operation and/or maintenance of the networked storage system 10, and is hereinafter referred to as the 'last known good' copy of the critical data.

According to one aspect of the invention, the data that is stored in a Resume Prom may include a combination of critical and non-critical data. Critical data is defined herein as being data that the system requires in order to boot or maintain operation. Conversely, non-critical data is any data that the system does not require in order to boot or maintain operation. The decision as to which data is critical and which is non-critical is largely design dependent. According to one aspect of the invention, only the critical data that is stored in the networked storage system is copied to persistent media. The remaining non-critical information may be frequently accessed, but a redundant copy of the data is not maintained. Because the data is non-critical, single point failures at the EEPROMs and bus 15, should they occur, will not bring down the system.

As will be described in more detail below, the critical data is copied at initial powerup and boot of the operating system, to the persistent storage media. By copying the critical component data to persistent memory at these times, the potential adverse affects of non-redundancy of the Resume PROMs and the bus 15 in the high-availability system are minimized. This is because after the data has been copied to persistent storage there is no dependency on the Resume PROMs as the sole source of the critical data. If, after initialization and reboot, a single-point fault occurs either on the bus 15 or at the PROM, the critical data can be subsequently retrieved from existing persistent storage, without further use of the failed elements. Thus, the present invention provides an architecture for storing both critical and non-critical information in high-availability system without device redundancy.

Figure 2:
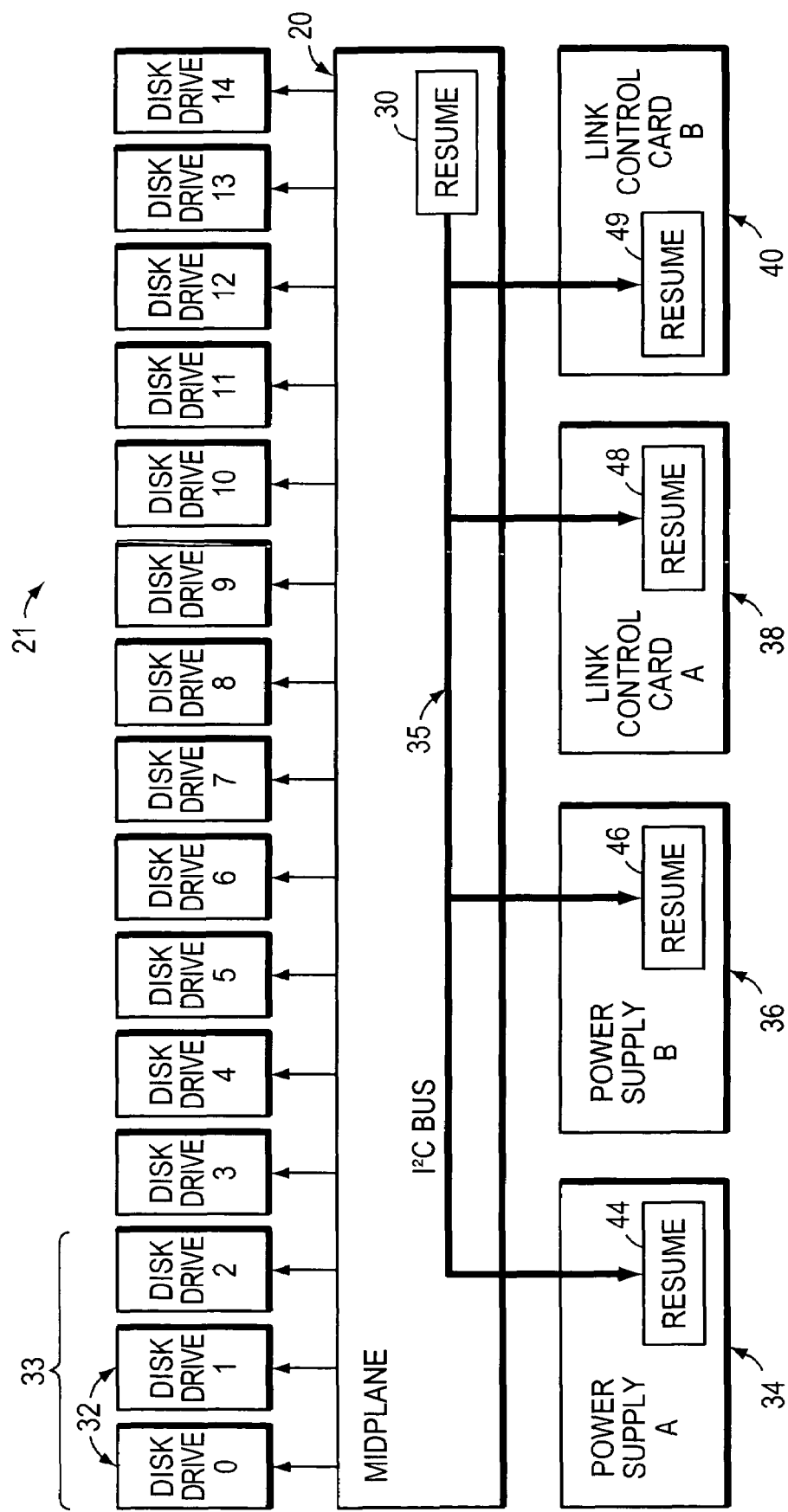
FIG. 2 is a block diagram of an alternate embodiment of a networked storage system in which the present invention may be implemented.

Referring now briefly to FIG. 2, a diagram illustrating the use of disk devices as the persistent media of the present invention is shown. Networked storage system 21 illustrates an expansion box including a number of disk drives 32 coupled by midplane 20 to power supplies 34, 36 and link control cards (LCCs) 38 and 40. In the embodiment of FIG. 2, Resume PROMs are provided in the LCCs 38 and 40, midplane 20 and the power supplies 34 and 36. Resume PROMs are not shown included in the disk drives, although utilizing the concepts of the present invention, any FRU component could have a Resume PROM for storing identity information. As will be described in more detail below, during initialization and reboot, data from each of the Resume PROMs 30, 44, 46, 48 and 49 is retrieved by the storage processors and checked for validity. After verifying the validity of the PROM data, a selected sub-set 33 of the disk drives 32 is used as the persistent storage media for storing a portion of the data stored in Resume PROM 30 (i.e., certain critical data stored on the midplane 20). The sub-set of disks 33 consists of a set of triple mirror disk drives for added redundancy.

Figure 3:
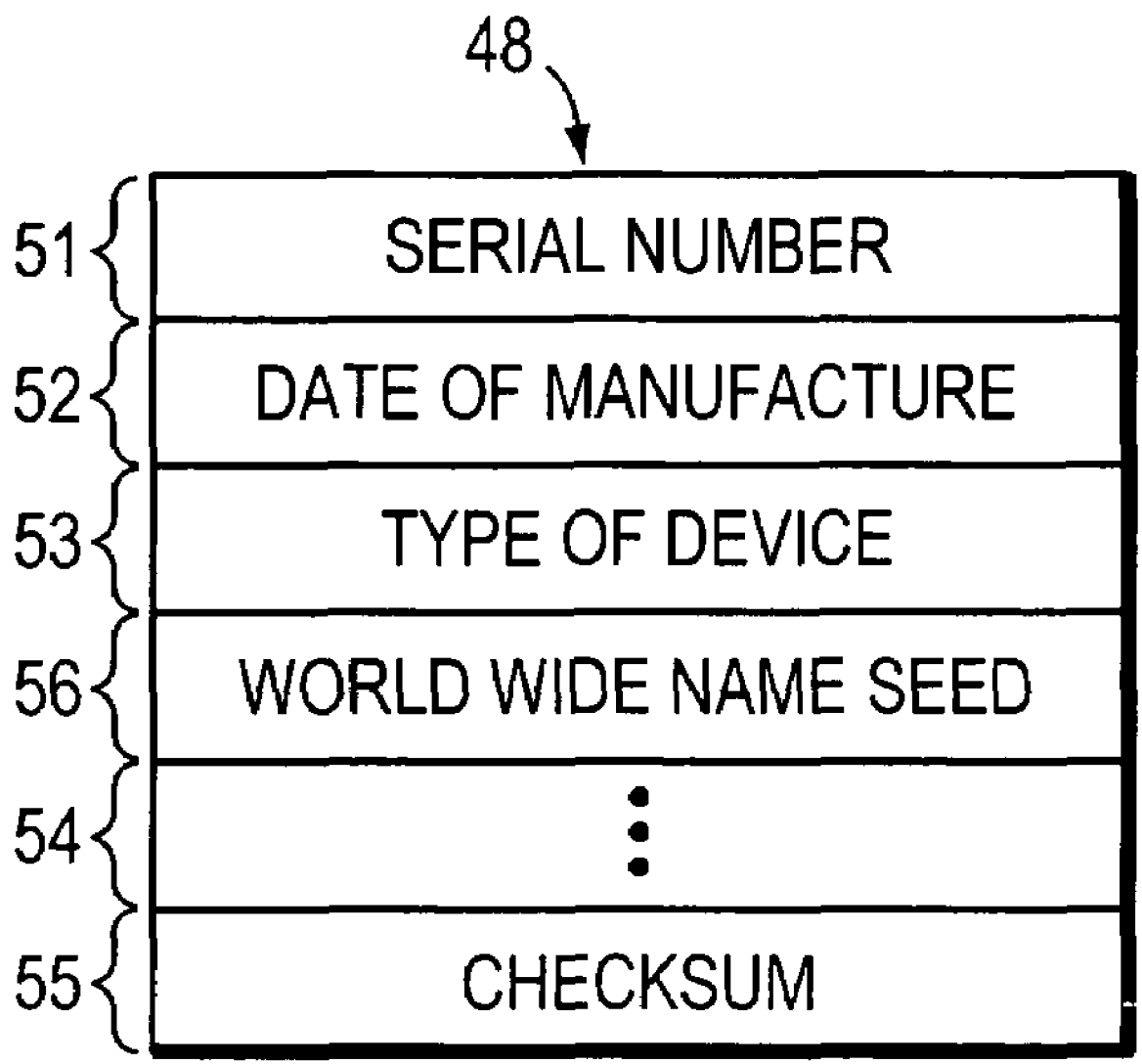
FIG. 3 is a diagram of an exemplary data structure that may be used to store Resume information in the systems of FIG. 1 or 2.

Referring now to FIG. 3, exemplary contents of Resume PROM 48 are shown to include at least three basic types of information. The first type of information is so-called 'identity data', and can include information such as serial number 51 of LCC 38 (FIG. 2), a field indicating the type of the device 53, or a World Wide Name seed 56. Such information could be considered 'critical' information. As an example, the Type of Device field can be used to test if a peer device is compatible before allowing the operating system to boot. Devices 12 and 14 can check each other's type (located in Resume PROMs 22 and 24).

The second type of information is so-called 'manufacture' information, and can include, for example, the date of manufacture 52. Other types of manufacture information may include the number of times the component has been serviced, the last date of service, or the like. In addition, so-called 'sanity check' information, such as a checksum 55 is maintained in the PROM. The sanity information is used, as is known in the art, for error checking and correction purposes. In one embodiment of the invention, the Resume PROMs are manufactured from 4 kbyte Rom devices, although any size that is capable of storing the determined Resume data could be used.

In one embodiment, certain persistent media devices are used for storing associated critical data. For example, in the example of FIG. 1, NVRAM 13 may be used to store only the critical data associated with processor 12 and stored in Resume PROM 22. In FIG. 2, disk devices 33 are used to store the critical data from the midplane 20. It should be noted, however, that the present invention should not be limited to such an arrangement, and it is envisioned that persistent media may alternatively be used to store any combination of critical or non-critical data from any Resume PROM coupled to bus 15.

Typically the data is written into the Resume PROMs at the manufacturing facility, and is not overwritten once it is initially stored. However, there are exceptions to this scenario, such as the World Wide Name seed data. For example, world-wide name seeds are used in Fibre Channel to generate a world-wide name for each port within a storage array. The World Wide Name Seed is usually associated with the chassis, and is therefore stored in the Resume PROM on the midplane. Using the Fibre Channel protocol, once a customer configures their networked storage system, they can identify the system using the world wide names associated with the system. In the event that the midplane/enclosure component fails, a new midplane/enclosure pair should be provided that has the same world wide name seed as the original, failed pair. Otherwise, the networked storage system would have to re-initiate all communication links in the network. To prevent such a situation from occurring, at operating system boot, the World Wide Name Seed data from the failed midplane/enclosure pair is used to overwrite the seed data in the Resume PROM associated with the newly provided midplane/enclosure pair. Thus, although the general discussion below refers to instances of reading the Resume PROMs, it should be understood that the present invention includes the ability to write Resume PROMs when necessary to transfer historic characteristic data to an upgraded component.

It should be noted that the data included in the Resume PROM of FIG. 3 is shown for example purposes only, and the present invention is not limited to the provision of any particular data within the PROM; rather, it is intended that the Resume PROM may be used to store any data that is of interest to the system. In addition, it should be noted that not every Resume PROM would include the same characteristic data; it may be that Resume PROMs associated with certain devices (including processors or link control cards) include type information, while Resume PROMs associated with power supplies do not. Thus, the present invention provides a flexible means of retaining any non-critical information that is deemed of interest for any type of component.

Figure 4:
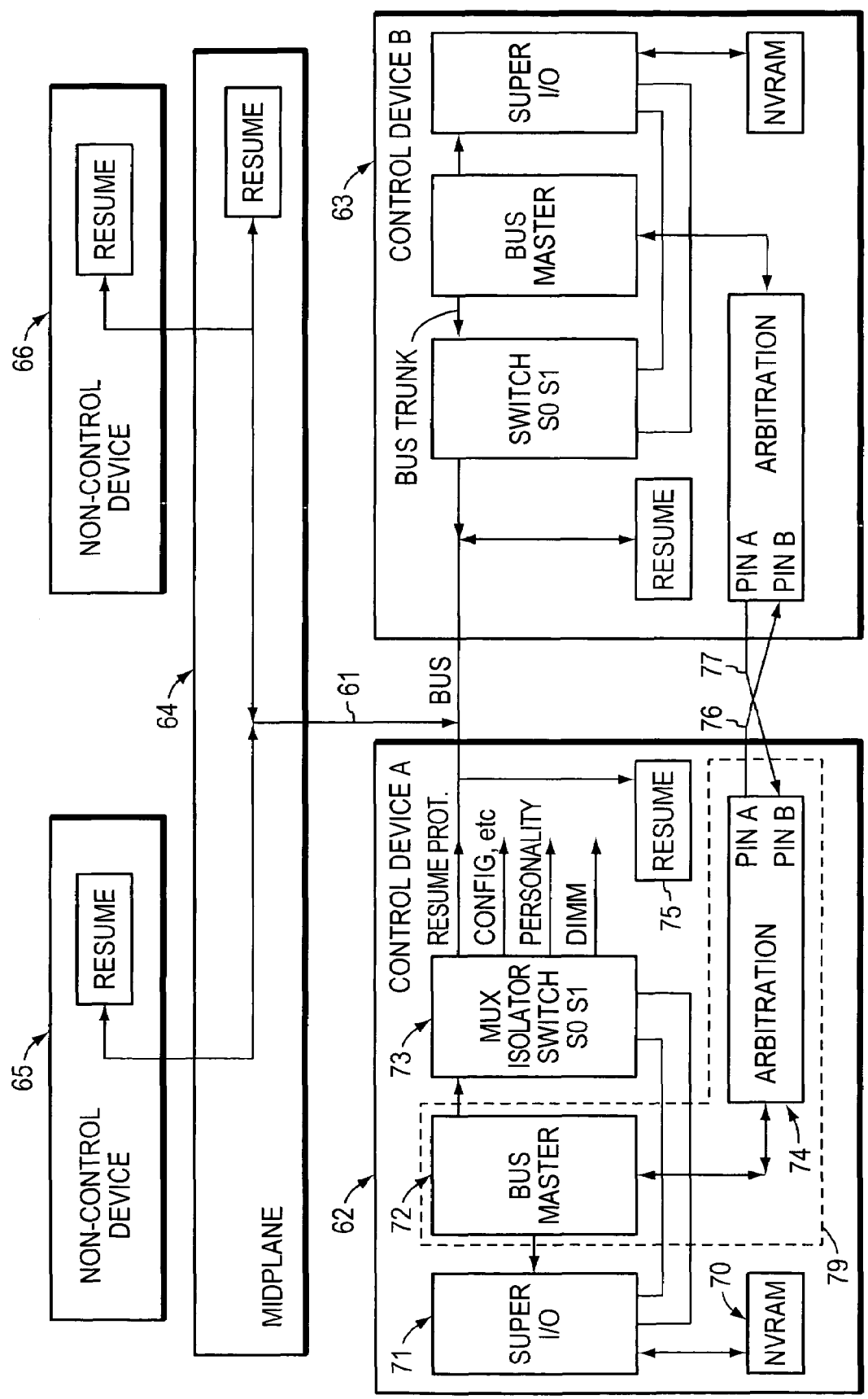
FIG. 4 is a more detailed block diagram of functional components that may be present in devices of the systems of FIG. 1 or FIG. 2.

Referring now to FIG. 4, one embodiment of exemplary components that are included on storage processor devices 62 and 63 are shown. Each device, such as device 62 includes a number of general functional blocks, including a bus master 72, an isolation switch 73, a non-volatile RAM storage device 70, a Super I/O device 71, and arbitration logic 74 that are used specifically for the purposes of storing non-critical data in persistent media. It is understood that the devices may include other logic, but that logic is not shown herein for the purposes of clarity.

In one embodiment of the invention, the functionality for the Bus Master Device 72 is embodied in a standard Pentium architecture Southbridge, one of whose jobs is a bus master, although other devices may alternately be used. These devices operate in response to signals from a processor or other sort of device (not shown) on the device 62.

Shown coupled to the Southbridge 79 is a Super I/O device 71. In one embodiment, the Super I/O device 71 may be a National 87C417 device provided by National Semiconductor. The Super I/O 71 is an enhanced I/O controller that is used to support certain I/O devices, such as NVRAM 70. In general, the Southbridge 79, the isolation switch 73 and Super I/O 71 work together to control access to the Bus 61. The isolation switch 73 is coupled between the Bus Master Device 72 and the main Bus 61. While the Southbridge provides source data and clock signals (Trunk signals) for the Bus, the Super I/O controls the isolation switch, and thus whether the Bus 61 branch receives the data and clock signals.

Although this application illustrates only one set of devices (the Resume PROMs) coupled to the Bus 61, in one embodiment, the two wire serial bus is apportioned into 4 distinct branches, one of which is Bus 61. The branches perform various data gathering functions for the networked storage processor In the embodiment where the Bus includes numerous branches, an isolation switch is provided to ensure that failures caused by the Resume PROM datapath do not propagate throughout the system. In one embodiment, the isolation switch is implemented using a multiplexing device, with the Super I/O device selecting which of the branches is to transmit or receive data from the two wire Trunk.

The above method for switching the Bus 61 helps reduce the propagation of faults in the following manner. In typical prior art designs, such as known I$^2$C bus designs; the control over the switching of I²C paths is done using the I²C signals themselves (i.e., a straight memory mapped design). In the event of a fault on the I2C bus, the effects of the fault could potentially be propagated through the system, with erroneous addresses causing unpredictable situations in configuration registers and the like. In contrast, in the present invention the I²C bus (or SMbus, or alternative two wire bus) is isolated by the multiplexer. Operations on the bus occur only when the multiplexed switch enables the data path for the branch, and verifies that the path is operable. In the event that the Bus fails, the effects of the failure can be isolated until the bus can be repaired. As a result, the system maintains its high availability characteristic without extraneous hardware.

As shown in FIG. 4, each of the devices 62 and 63 include logic for controlling the Bus 61. In one embodiment, because of a chipset design selection, both of the devices include standard Master controller logic, but do not include additional functionality to support a multi-master environment. In order to provide multi-master arbitration with minimal complexity, a simple protocol is used to arbitrate for the serial bus in a multi-master environment without the additional hardware complexity. Arbitration logic 74 uses a simple arbitration scheme and available handshake signals 76 and 77. The handshake signals 76 and 77 are essentially cross-over bus request/control signals. Thus, the handshake signals 76 and 77 each provide the other device with knowledge of whether the peer device is requesting or controlling Bus 61 at any point in time.

Figure 5:
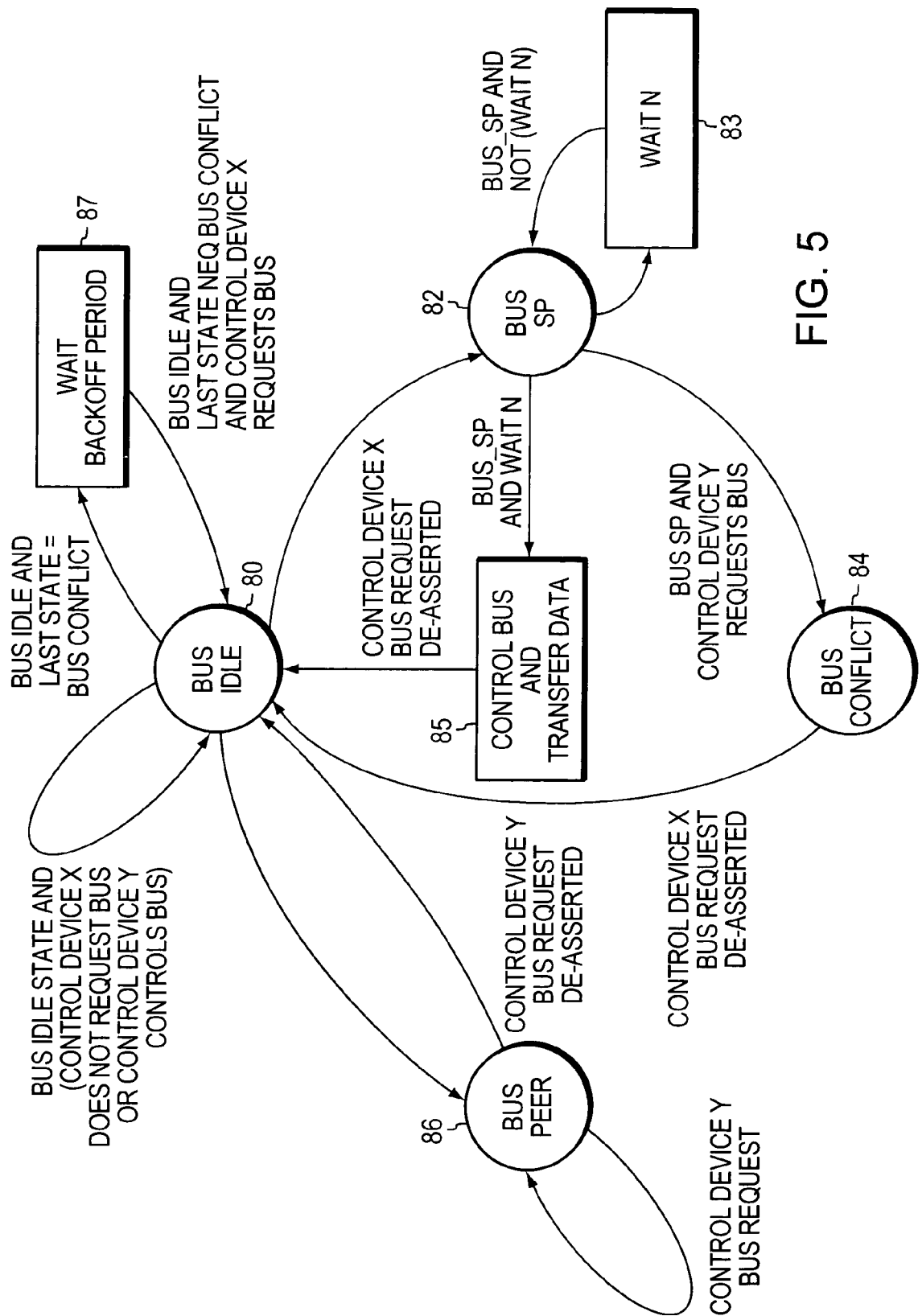
FIG. 5 is a state diagram for illustrating an arbitration scheme used by each device for accessing a two wire serial bus in the system of FIG. 1 or 2.

Arbitration for the bus may be performed using a process similar to that shown in FIG. 5. Using the two handshake signals to determine state, there are basically four arbitration states for the Bus 61: BUS IDLE, BUS SP, BUS CONFLICT and BUS PEER. In BUS IDLE state, neither of the devices is requesting access to the Bus 61. In BUS SP state, the control processor seeking to access the Bus has obtained access, and can start initiating reads or write requests on the bus. In BUS CONFLICT state, both control processors have accessed the Bus 61 at the same time, and they must back off and start trying to gain access again. In BUS PEER state, the peer device (i.e., the other device from the viewpoint of the device seeking access) has gained access to the Bus.

The state diagram of FIG. 5 will now be described as though a system includes two devices X and Y coupled by a two-wire serial bus operating under the I2C or SMBus protocol. The transition of states would occur in device X, although identical functionality would be included in device Y. As shown in the state diagram of FIG. 5, at state 80 the bus interface of device X is in BUS IDLE STATE. As is known in the art, in the SMBus and I2C protocol, in BUS IDLE state, the data and clock portion of the two wire serial bus is left in a non-asserted state which floats high via pull-up resistors. Devices wanting to use the bus detect the BUS IDLE state by determining that both signals have floated high. Since both signals (data and clock) are open collector either device X or Y can bring a signal low but both devices must release a signal for it to go high. Thus multiple devices can start driving addresses simultaneously and watch the state of both signal lines while doing so.

Under the standard SMBus or I2C bus protocol, to begin a transaction, a device drives a START condition onto the bus. Certain predefined fields follow, depending upon the type of command and data pair being driven on the bus. When the device is finished with data transmission, a STOP condition is generated, releasing the bus, allowing it to float high again.

In the particular bus arbitration sequence shown in FIG. 5, the crossover handshake lines 76 and 77 are driven and monitored by devices X and Y. When device X seeks to control bus 61, it asserts it handshake output signal (acting as a bus request), and transitions to BUS_SP state. In BUS_SP state, device X waits a predetermined time period, WAIT N. The predetermined time is selected to ensure that device X and Y do not attempt to gain access to the bus at roughly the same point in time, and should be selected to allow for the signal propagation delay between device X and device Y. If device Y does not assert its handshake output signal before the end of the WAIT N period, device X owns the bus, and transitions to transferring data at 85. If, before the end of the WAIT_N period, device Y asserts its handshake output signal, then it can be assumed that device Y has attempted to gain access to the bus during this time interval, and device X transitions to BUS CONFLICT state. Device X must de-assert its handshake output signal, return to the BUS IDLE state, and wait the prescribed back off period before requesting the bus again. Because device Y is arbitrating for the bus using the same mechanism, in the event that both devices attempted to gain use of the bus at the same time, device Y will also transition to BUS CONFLICT state. Thus, in the event that both devices attempted to gain access to the bus at substantially the same time, the handshake/bus request signals 76 and 77 can be used to detect such an occurrence and cause both devices to back off requesting the bus for a predetermined time period.

In one embodiment, in order to minimize bus conflicts, the amount of time to back off is different for each device 62 and 63, with the amount of time being dictated by the slot into which the device is coupled, although any alternative method of assigning different back off intervals could also be used. Example back off times may be 25 ms for device X and 250 ms for device Y. Thus, in the event that both devices transition to BUS CONFLICT state, and then BUS IDLE state substantially simultaneously, device X waits for a back off period at 87, and returns to BUS IDLE state at a different time than device Y. Because each of the devices has a different back off interval, it is virtually guaranteed that the conflict will be resolved in the next bus arbitration cycle.

If device X is in BUS_IDLE state 80, and it detects that device Y has asserted its handshake output signal, device X transitions to state BUS PEER 86 until the line is released, at which point state transitions back to BUS IDLE. While in the BUS PEER state 86 device X does not attempt to assert its own handshake output signal.

The above arbitration method provides a straightforward way to arbitrate between two devices for access to a shared bus with minimal complexity, and may be implemented in software, as in the preferred embodiment, or alternatively in hardware due to its minimal complexity.

Figure 6:
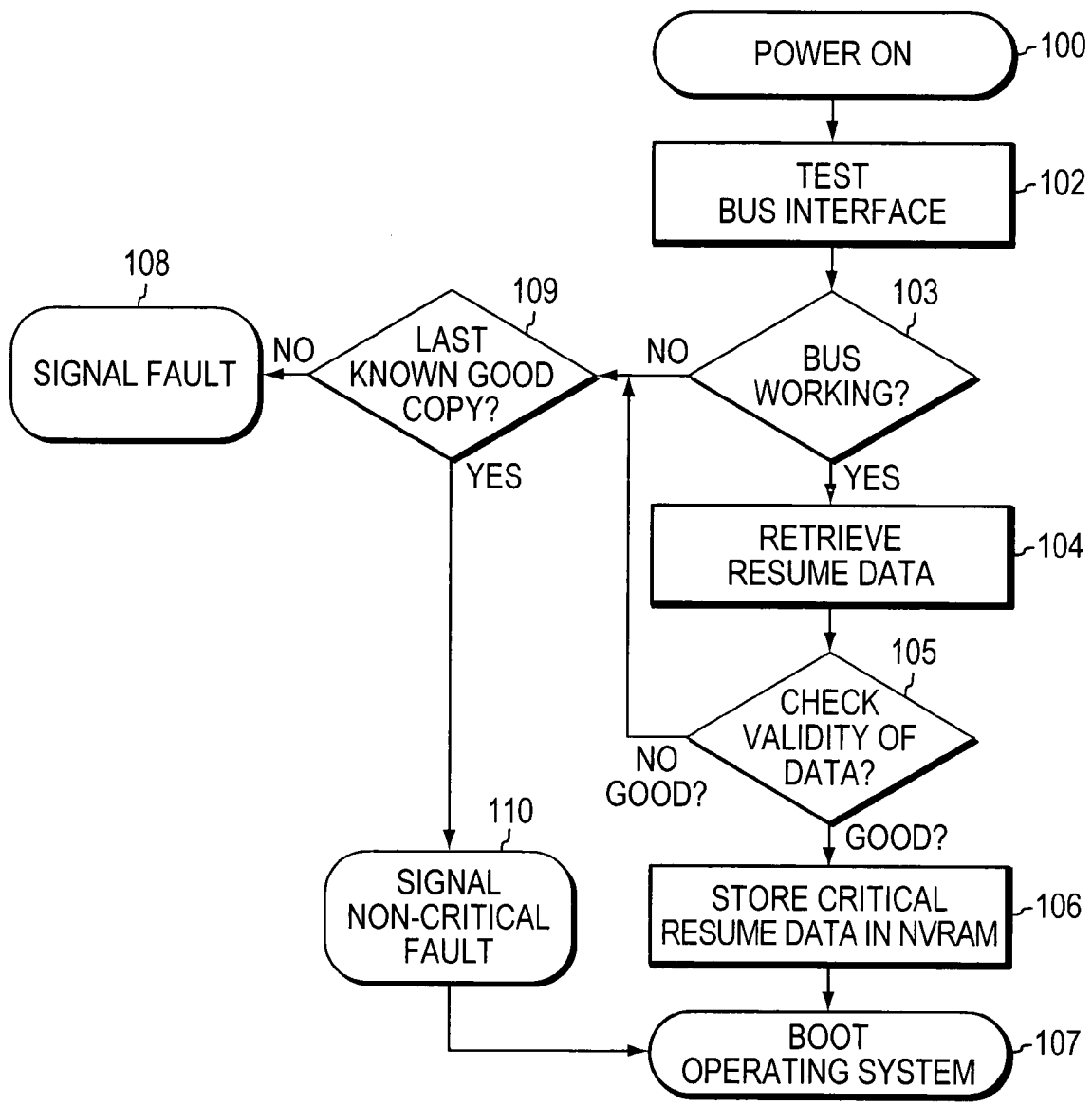
FIG. 6 is a flow diagram illustrating an exemplary process that may be used at initialization in the systems of FIG. 1 or FIG. 2 to retrieve and store the component characteristic data of FIG. 3.

Having described an architecture for storing component characteristic data and a mechanism for accessing a bus connecting the characteristic data, a method for copying the data to persistent memory for the purpose of collecting a 'last known good copy' will now be described with reference to FIGS. 6 and 7. It should be noted that, although the transfer of data to the persistent media is described as occurring generally at power up and boot of the operating system, it is envisioned that there may be situations during operation when the last known good copy of the data should be updated (i.e., if one of the components is swapped out, or a new component is added into a slot during operation), and thus the present invention should not be limited to executing at only the times described with regard to FIGS. 6 and 7.

Following the networked storage system power on at step 100, at step 102 each storage processor coupled to the midplane checks to verify that the two wire serial Bus 61 and associated interface is operating correctly by testing the bus interface. To ensure the bus is operating correctly, various diagnostic tests may be performed, such as writing and reading data to the PROMs, calculating checksums, and other diagnostic tools known to those in the art. Should the diagnostic tests indicate a failure of the Bus 61, the process proceeds to step 109, where it is determined whether or not a 'last known good copy' of critical data associated with the storage processory has already been stored in its associated NVRAM. As described above, such a situation could occur in the event that a reboot of the storage processor is performed at any time other than the initial power up of the networked storage system, and at reboot it is detected that there is an error with the bus or EEPROM. In the event that a 'last known good copy' is saved, the storage processor signals a non-critical fault at step 110, and proceeds to boot the operating system at step 107. The non-critical fault indicates that there is a problem in the enclosure that requires repair, but it does not stop initialization.

Alternatively, if it is determined at step 109 that no last good copy is saved, and that the bus is not working, then the process proceeds to step 108, where a critical fault is signaled and initialization is halted, since access cannot be had to critical system data.

If, however, it was determined at step 103 that the Bus 61 is operating as expected, the process continues to step 104 where the Resume PROM data from each component coupled to the midplane is retrieved and stored in memory. At step 105 the data stored in the retrieved memory is checked for validity by calculating the checksum. If it is determined at step 105 that the data retrieved from the Resume PROM is invalid, then the process proceeds to step 109 to search for last known good data as described above.

If, however, it is determined at step 105 that the data is good, then at step 106 the critical components of the data that are associated with the given storage processor are stored in the persistent memory of the storage processor.

Once the last known good copy of data is stored in the NVRAM at initialization, the high availability system is protected from any single points of failure on the Bus 61 or any of its coupled components for at least two reasons. First, the bus branch architecture, discussed with regard to FIG. 4, effectively isolates the system from the propagation of any fault on the bus or PROM devices. Second because there are now two copies of the component characteristic data in the system (one at each NVRAM of the storage processor and the data contained in the Resume PROMs themselves), the component characteristic data is virtually always recoverable in the face of a single point of failure.

A particular feature of the architecture is that it is capable of maintaining high-availability support for the component characteristic data without the use of redundant components; a single Bus 61 is routed to single copies of the Resume PROMs. The only redundancy lies in the copies of the component characteristic data, which are obtained and stored in a manner that is similarly resilient in the face of single points of failures, and which use pre-existing persistent storage components typical to the storage processor/storage array architecture.

As mentioned previously, the present invention envisions storage of the component characteristic data in any form of persistent media. According to one embodiment of a networked storage system, a portion of the disk storage space is allocated to storing system data. In such an embodiment, this portion of disk storage space is used to store a last known good copy of the critical midplane data. During boot of the operating system, a method similar to that described in FIG. 6 is executed, however, the data is stored not in NVRAM devices, but in centralized disk storage. This method is shown in FIG. 7.

Figure 7:
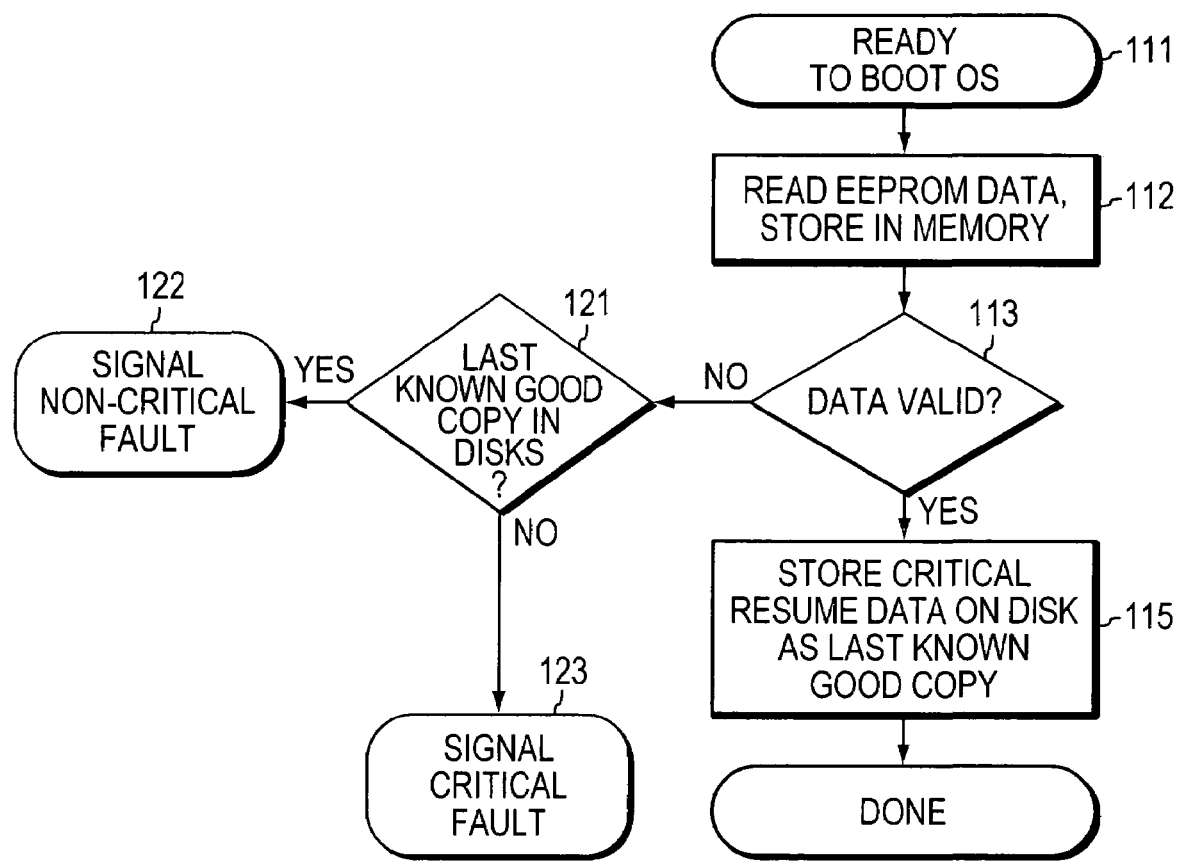
FIG. 7 is a flow diagram illustrating an exemplary process that may be used during boot of an operating system of the systems in FIG. 1 or FIG. 2, to retrieve and store the component characteristic information of FIG. 3.

In FIG. 7, at step 111 the system has completed initialization and the operating system is about to boot. At step 112, data is collected from all of the Resume PROMs and stored in memory. At step 113, it is determined whether the data is valid by calculating checksums for each set of data retrieved from the PROMs and comparing the data against the expected checksum. If at step 113 it is determined that the data is valid, the critical portion of the data stored in the Resume PROM of the midplane is copied to the disks, and the boot of the operating system can continue.

If, however, at step 113 it is determined that the data retrieved from the Resume PROM on the midplane is not valid, or that the data is not retrievable because of a fault on Bus 61, flow proceeds to step 121. At step 121, it is determined whether a valid last known good copy of the critical midplane data is stored in the disks. If it is determined at step 121 that there is no valid last known good data stored in the disks, then at step 123 a critical fault is signaled. Because the midplane Resume PROM is used to store the World Wide Name seed, in the event that the data stored in the PROM is not valid and no last known good copy exists, it would be impossible to provide a world wide name for the storage device, which is a critical system failure.

If, however, a last known good copy of the critical data does exist in the disks, then a non-critical fault is signaled at step 122. This fault condition signals an error with the bus or PROMs which is not fatal to the overall networked storage system.

Accordingly, an architecture for storing component characteristic data in a high-availability system has been described. This architecture provides single point of failure resiliency without redundancy of hardware through the use of persistent media, careful selection of the type of data stored in the persistent media and an architecture that isolates the system from potential faults caused by a non-redundant communication bus used to gather data for storage on the persistent media. In addition, a novel arbitration scheme is implemented that permits multi-master communication over the communication bus with minimal hardware complexity.

Having described various embodiments of the invention, it is understood that the present invention is not to be limited in scope by the specific embodiments described herein. Indeed, various modifications of the present invention, in addition to those described herein, will be apparent to those of ordinary skill in the art from the foregoing description and accompanying drawings. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. For example, though the invention has been described in the context of a storage system, it will be apparent to the skilled artisan that the invention is applicable in any system where it would be advantageous to preserve component characteristic information. The logic functions have been described in terms of certain types of gates, yet the skilled artisan will realize that there are many equivalent ways of implementing the described functionality, and that the described signals may be asserted at either a logical '1' or '0' level. All such modifications are intended to fall within the scope of the following appended claims. Accordingly, the claims set forth below should be construed in view of the full breadth and spirit of the present invention as disclosed herein.

What is claimed is:

1. A method for retrieving component characteristic data in a system having a plurality of coupled components, the method comprising the step of:
   storing characteristic data for a subset of the plurality of coupled components in a storage device on a corresponding component;
   retrieving the characteristic data from the storage device at each of the components in the subset over a bus coupled to each of the components in the subset; and
   storing a portion of the retrieved characteristic data in a persistent media device to provide a last known good copy of the portion of the characteristic data for the system, wherein the retrieved characteristic data includes a world wide name seed.

2. The method of claim 1 including the step of isolating the system from faults in the storage devices and the bus.

3. The method according to claim 1, wherein the portion of the characteristic data that is stored in the persistent media is considered to be critical data.

4. The method according to claim 1, wherein the characteristic data includes identity information, manufacturing information and sanity check information.

5. A method for retrieving component characteristic data in a system having a plurality of coupled components, the method comprising the step of:
   storing characteristic data for a subset of the plurality of components in a storage device on the corresponding component;
   retrieving the characteristic data from each of the components in the subset over a bus coupled to each of the components in the subset; and
   storing a portion of the retrieved characteristic data in a persistent media device to provide a last known good copy of the portion of the characteristic data for the system, wherein the system includes at least two devices, and wherein each of the devices drives one handshake signal to and receives one handshake signal from the other one of the at least two devices on the bus.

6. The method according to claim 5 wherein the step of retrieving the characteristic data over a bus includes the step of arbitrating, by each of the devices, for access to the bus in response to the handshake signals received by each device.

7. The method according to claim 5, wherein the persistent media is a non-volatile random access memory device.

8. The method according to claim 5, wherein at least one of the components of the system is a disk drive, and wherein the persistent media used to store the characteristic data is the disk drive.

9. A system comprising:
   a plurality of coupled components, wherein a subset of the plurality of coupled components each include a storage device for storing characteristic data associated with the component in which the storage device is included, wherein the characteristic data is component characteristic data selected from a group including identity data, sanity check data and manufacturing data;
   a bus, coupling the storage devices of each component in the subset of components; and
   persistent media, for storing a last known good copy of a portion of the characteristic data, wherein the characteristic data includes a world wide name seed.

10. The system of claim 9, wherein the subset of the plurality of components includes at least one control component, and wherein the persistent media is provided on the control component.

11. The system of claim 9, wherein the subset of the plurality of components includes at least one persistent media component, and wherein the last known good copy is stored on at least one persistent media component.

12. The system of claim 9, further comprising an isolator, coupled to the bus, to isolate the system from faults on the bus and in the storage devices.

13. The system of claim 9, wherein the bus is a serial two wire bus.

14. The system of claim 13, wherein the bus operates according to the $I^2C$ protocol.

15. The system of claim 13, wherein the bus operates according to the SMBus protocol.

16. A system comprising:
   a plurality of coupled components, wherein a subset of the plurality of coupled components each include a storage device for storing characteristic data associated with the component in which the storage device is included;
   a bus, coupling the storage devices of each component in the subset of components;
   persistent media, for storing a last known good copy of a portion of the characteristic data; and wherein the subset of the plurality of components includes at least one control component, the persistent media being provided on the at least one control component, wherein the control component further includes:
   an input sense signal, for sensing the status of the bus;
   arbitration logic, for arbitrating for control of the bus by the control component in response to the input sense signal.

17. The system of claim 16, wherein the arbitration logic further includes a back off mechanism used to prevent the control component from accessing the bus for a predetermined time period.

18. The system of claim 16, wherein the at least one control component comprises a pair of control components, each control component of the pair capable of controlling accesses to the bus, each control component comprising:
   an input sense signal, coupled to the other one of the control components, to detect whether the other one of the control components is driving the bus;
   an output sense signal, coupled to the other one of the control components, for communicating to the other one of the control components that the control component comprising the output sense signal communicating to the other control component is driving the bus;
   arbitration logic, coupled to the input sense signal and output sense signal, for controlling accesses to the bus by the pair of control components, the arbitration logic including back off logic for preventing access to the bus by an associated control component for a predetermined period of time.

19. The system of claim 18, wherein the predetermined period of time is different for each control component.

20. A component comprising:
   a storage device for storing characteristic data associated with the component;
   a bus, coupled to the storage device;

means for transferring a portion of the characteristic data to persistent media to provide a last known good copy of the portion of the characteristic data, arbitration logic, responsive to an input sensing signal, for controlling access to the bus by the component; and an output sensing signal, for indicating to an external device a drive state of the bus by the component.

21. A method for booting an operating system in a system comprised of a plurality of interconnected components, a subset of the interconnected components each including a storage device for storing characteristic data associated with the component in which the storage device is included, the method including the step of:

retrieving characteristic data from each of the storage devices of the subset of interconnected components;

verifying that the retrieved characteristic data is valid; and responsive to a determination that the retrieved characteristic data is valid, storing a portion of the characteristic data as a last known good copy in a persistent media, and indicating that a last known good copy of the characteristic data has been saved;

responsive to a determination that the retrieved characteristic data is not valid, determining whether a last known good copy of the portion of characteristic data has been saved in the persistent media, copying the last known good copy from the first persistent media.

22. The method according to claim 21, wherein the portion of characteristic data includes a world wide name seed.

23. The method according to claim 21, wherein the persistent media is a disk drive.

* * * * *